US011929565B2

(12) United States Patent
Ferderer et al.

(10) Patent No.: US 11,929,565 B2
(45) Date of Patent: Mar. 12, 2024

(54) INTERFACE FOR A PRINTED CIRCUIT BOARD

(71) Applicant: HARTING ELECTRIC GMBH & CO. KG, Espelkamp (DE)

(72) Inventors: Albert Ferderer, Espelkamp (DE); Christof Hermoni, Espelkamp (DE)

(73) Assignee: HARTING ELECTRIC GMBH & CO. KG (DE)

( * ) Notice: Subject to any disclaimer, the term of this patent is extended or adjusted under 35 U.S.C. 154(b) by 340 days.

(21) Appl. No.: 17/608,109

(22) PCT Filed: Apr. 28, 2020

(86) PCT No.: PCT/DE2020/100349
§ 371 (c)(1),
(2) Date: Nov. 1, 2021

(87) PCT Pub. No.: WO2020/221398
PCT Pub. Date: Nov. 5, 2020

(65) Prior Publication Data

US 2022/0294138 A1 Sep. 15, 2022

(30) Foreign Application Priority Data

Apr. 30, 2019 (DE) ..................... 10 2019 111 193.5

(51) Int. Cl.
*H01R 12/71* (2011.01)
*H01R 12/58* (2011.01)
(Continued)

(52) U.S. Cl.
CPC ........... *H01R 12/716* (2013.01); *H01R 12/58* (2013.01); *H01R 12/7047* (2013.01); *H01R 12/724* (2013.01)

(58) Field of Classification Search
CPC .... H01R 12/716; H01R 12/712; H01R 12/58; H01R 12/55; H01R 12/51; H01R 12/7047; H01R 12/724; H01R 12/722; H01R 12/72
(Continued)

(56) References Cited

U.S. PATENT DOCUMENTS

| | | | | |
|---|---|---|---|---|
| 6,261,107 | B1 | 7/2001 | Takase et al. | 439/79 |
| 2022/0294138 | A1 * | 9/2022 | Ferderer | H01R 12/716 |

FOREIGN PATENT DOCUMENTS

| | | |
|---|---|---|
| DE | 10 2007 039 064 | 2/2009 |
| DE | 20 2010 003 457 | 7/2010 |

(Continued)

OTHER PUBLICATIONS

International Search Report and Written Opinion issued in PCT/DE2020/100349, dated Jul. 16, 2020, with English translation, 19 pages.

(Continued)

*Primary Examiner* — Khiem M Nguyen
(74) *Attorney, Agent, or Firm* — HAYES SOLOWAY P.C.

(57) ABSTRACT

An interface for electrically contacting a printed circuit board housed in a housing is formed as a double-sided and/or two-part interface by a first interface having at least one first contact element which is brought into electric contact with at least one terminal of the printed circuit board; a second interface having at least one second contact element corresponding to the first interface and arranged on an opening of the housing in a stationary manner such that the first and second contact elements are brought into contact with each other. The second contact element provides a terminal which can be contacted from outside the housing, wherein plug-in and/or pulling forces acting on the terminal are received by the second interface and/or the housing. The
(Continued)

second interface is designed for connecting a plug connector on the housing exterior, and the first contact element is provided by a stamped bent contact.

18 Claims, 7 Drawing Sheets

(51) Int. Cl.
*H01R 12/70* (2011.01)
*H01R 12/72* (2011.01)

(58) Field of Classification Search
USPC ........................................................... 439/79
See application file for complete search history.

(56) References Cited

FOREIGN PATENT DOCUMENTS

| | | |
|---|---|---|
| GB | 2 337 369 | 11/1999 |
| WO | WO 2018/092068 | 5/2018 |

OTHER PUBLICATIONS

International Preliminary Report on Patentability issued in PCT/DE2020/100349, dated Nov. 2, 2021, 8 pages.
German Search Report issued in German Patent Appln. Serial No. 10 2019 111 193.5, dated May 4, 2020, with English translation, 9 pages.

* cited by examiner

INTERFACE FOR A PRINTED CIRCUIT BOARD

The invention relates to an interface for electrically contacting a printed circuit board. The invention here relates in particular to an interface provided for contacting by means of an electric plug connector. The invention here moreover relates in particular to a printed circuit board contact which is suitable for an interface of this type. The invention here moreover relates in particular to an interface of this type which is suitable for a power terminal connector.

Such interfaces are required in particular in the apparatus connection technology, wherein reliable electrical contacting of a printed circuit board by means of a plug connector by way of the interface is desirable for many plug-in cycles.

PRIOR ART

An interface of this type which by means of a printed circuit board plug connector which is provided having a plug connector housing and having at least one contact element is known for example from DE 20 2010 003 457 U1. The contact elements are in particular configured as contact pins for electrically connecting to a contact location on a printed circuit board. The printed circuit board plug connector is a coaxial plug connector which has an inner conductor and an outer conductor which are electrically connected to contact elements which are configured as contact pins and for electrically connecting to corresponding terminals on the printed circuit board.

To this end, the contact pins engage in corresponding recesses in the printed circuit board and are electrically and mechanically connected to the printed circuit board by means of soldering, for example, such that an electrical connection between the inner conductors and the outer conductors and an electrical circuit on the printed circuit board is established. The contact pins here moreover simultaneously serve for mechanically connecting the printed circuit board plug connector to the printed circuit board and hereby fix and support the plug connector housing on the printed circuit board.

When activating the printed circuit board plug connector by means of a mating plug connector there is therefore the risk of an undesirable transmission of plug-in and extraction forces to the printed circuit board by way of the contact pins, the printed circuit board as a result being able to be damaged in particular in the case of repeated plug-in procedures.

The German patent and trademark office in the context of the priority application pertaining to the present application has researched the following prior art: DE 10 2007 039 064 A1, DE 20 2010 003 457 U1, and WO 2018/092068 A1.

SET OF OBJECTS

The object of the invention lies in specifying a reliable interface for electrically contacting a printed circuit board, said interface also being suitable for contacting a power terminal connector to the printed circuit board. The object here also lies in particular in specifying an above-mentioned interface of this type which is suitable for preventing or at least partially reducing the effect of plug-in and/or extraction forces on the printed circuit board. The object of the invention here moreover relates in particular to specifying a printed circuit board contact which is suitable for an above-mentioned interface.

Advantageous embodiments of the invention are set forth in the the description hereunder.

The invention relates in particular to an interface for electrically contacting a printed circuit board which is accommodated in a housing, wherein the interface by means of a first and a second interface is configured as a double-sided and/or two-part interface. As a result of the above-mentioned double-sided and/or two-part configuration according to the invention, part of the interface can be fastened to the housing and thus, when the interface is contacted from outside the housing, in particular by means of a plug connector, absorb all of the plug-in and extraction forces which arise when contacting the interface and/or when releasing an interface contact, while the printed circuit board is advantageously not stressed.

An above-mentioned interface which is configured so as to be double-sided and/or in two parts is therefore particularly reliable and suitable for a desirable high number of plug-in cycles.

The first interface of the double-sided and/or two-part interface here suitably has a contact element which is brought to electrically contact at least one terminal of the printed circuit board.

The second interface of the double-sided and/or two-part interface here suitably has at least one second contact element and is configured so as to correspond with the first interface and disposed and/or fixed in a locationally fixed manner on an opening of the housing in such a manner that the first and the second contact element are brought into contact with one another, and the second contact element provides a terminal which is able to be contacted from outside the housing.

Provided by means of the combination and the interaction of the first interface and the second interface having the above-described features is an interface according to the invention which is configured so as to be double-sided and/or in two parts and which has the above-described advantages.

The first contact element of the first interface is suitably disposed and configured so as to correspond with the second contact element of the second interface, wherein the first contact element can advantageously have, for example, a socket and the second contact element, at least inside the housing, can be configured as a pin contact having a pin, and wherein the pin contact can be inserted into the socket.

The socket of the first contact element and the pin contact of the second contact element here can be advantageously correspondingly disposed and configured in such a manner that more than one contact location between the first and the second contact element can be provided by means of the pin contact that interacts with the socket. In this way, the possibility of configuring the double-sided and/or two-part interface with a particularly low resistance is advantageously achieved. The pin contact of the second contact element here is suitably oversized to a predetermined extent in relation to the socket of the first contact element.

A first contact element having an above socket can suitably be provided by means of a stamped-bent contact which has a flat central portion and a curved portion which adjoins the central portion and by means of which the socket is formed. Stamped-bent contact can be produced in volumes, and in particular also in small volumes, in a simple and cost-effective manner.

For electrically contacting the printed circuit board, the first contact element can suitably have at least one foot which is brought to contact at least one terminal of the printed circuit board. The foot here, like the above-described socket, can be configured on the flat central portion of the first contact element.

The foot can advantageously engage in a terminal of the printed circuit board that is configured as a recess in the printed circuit board and be soldered and/or press-fitted to the terminal of the printed circuit board such that a reliable electrical contact between the first contact element and the terminal of the printed circuit board is provided.

Moreover, the foot on a first side of the central portion of the first contact element can extend in a first direction, and the socket by way of the axis thereof on a second side of the central portion can extend parallel to the first direction. The second side on which the socket is configured can particularly advantageously also be that side of the central portion that is opposite the first side such that the socket by way of the axis thereof can be disposed so as to be perpendicular to the first direction. It is obvious that the socket that is provided for contacting the second contact element of the second interface here is disposed so as to be adjacent to the opening of the housing and so as to face the opening. The first interface here is suitably disposed on a periphery of the printed circuit board.

By means of the above disposal of the socket having the axis thereof perpendicular to the first direction in which the foot extends, the first interface by means of the first contact element configured in this way is advantageously implemented as an interface which provides a contact with the printed circuit board and is able to be plugged onto the printed circuit board at an angle of 90°, whereas the socket is able to be plugged parallel to the printed circuit board. The first contact element of the first interface here, in terms of the contacting directions thereof, provides an advantageous change of direction by an angle of 90°.

For many applications it is moreover desirable for a printed circuit board to be accommodated on the base of a housing, while openings for external terminals which are suitably on a lateral wall of the housing are desirable. For particularly simple mounting of the first interface which is already mounted on the printed circuit board, the first interface is suitably configured and disposed on a periphery of the printed circuit board in such a manner that the first interface can extend beyond the periphery of the printed circuit board only by a predetermined minor amount, such that the printed circuit board, having the first interface already assembled on said printed circuit board according to the intended use, can be inserted into a housing that is open at the top without being tilted and/or slanted.

Moreover, the first contact element can at least be partially accommodated in a first insulating member, wherein the first insulating member to this end can have a suitable rail-type fixing contour which, for example, advantageously interacts in a form-fitting manner with a shoulder of the first contact element, wherein the shoulder can suitably be configured on the central portion of the first contact element as to be adjacent to the socket.

When providing the first insulating member having the first contact element accommodated therein, the first contact element upon being simply inserted into the rail-type fixing contour of the first insulating member, can be mounted on the printed circuit board in a particularly simple manner. Moreover, when providing more than one first contact element for providing a first interface having more than one terminal, a predetermined number of first contact elements which are suitably disposed in parallel next to one another and in succession in one row can be provided. A corresponding predetermined number of fixing contours which are configured in a form-fitting manner with the first contact elements here are suitably configured in the first insulating member.

In a first interface configured in such a manner, clearances and creepage distances in the first interface can be advantageously extended by means of the first insulating member. Moreover, the first insulating member, in particular in a first interface having a multiplicity of first contact elements as described above, as a mounting aid is particularly advantageous. Moreover, the first insulating member imparts the first interface a desirable level of stability, wherein the first insulating member to this end can also have latching elements for latching to the printed circuit board.

A first contact element of the first interface can moreover have more than one foot for contacting a terminal of the printed circuit board, wherein the feet can suitably have a predetermined small dimension and be mutually disposed and configured at a predetermined spacing in such a manner that a transfer of current of the first contact element is implemented by way of a plurality of small terminals.

As a result of this measure, the possibility of requiring and/or generating less effort and/or a lower temperature when soldering is advantageously achieved when mounting the first contact element. Moreover, generation of heat as a result of the current flow through the first contact element can be minimized as a result of this measure. An above first contact element of this type, having a predetermined number of feet, is therefore advantageously suitable in particular also for transmitting high currents in the range of 50 A. It is obvious that a first contact element suitable to this end moreover has to be suitably conceived in terms of the material thereof and/or the material thickness thereof and/or of the configuration.

The second interface of the double-sided and/or two-part interface mentioned at the outset can suitably be provided by means of a second insulating member which is configured in a form-fitting manner with the opening of the housing, and in which the second contact element is accommodated so as to be locationally fixed in such a manner that one end of the second contact element for contacting the first contact element extends into the interior of the housing, and one end of the contact element provides the terminal mentioned at the outset which is accessible from outside the housing.

The second contact element here can suitably have a contour which interacts in a form-fitting manner with an internal contour configured in the second insulating member in such a manner that the second contact element is held in the second insulating member in such a manner that, when plug-in and/or extraction forces act on the above externally accessible terminal provided by means of the second contact element, the plug-in and extraction forces are completely transmitted to the second insulating member and/or by way of the second insulating member to the housing. The second insulating member which according to the intended use is disposed on the opening of the housing here is suitably screwed to the housing and configured from a suitable plastics material, and moreover has dimensions, in particular of the thickness of said insulating member, that are suitable for this purpose.

In order to compensate for tolerances for contacting the second interface according to the intended use by way of the first interface already disposed in the interior of the housing, the opening which corresponds in a form-fitting manner with the second insulating member, and in particular bores which for fastening the insulating member are configured in the insulating member, can be oversized to a predetermined extent.

A second interface which is suitable for a double-sided and/or two-part interface described at the outset can on the external side of the housing be in particular configured so as to be suitable for connecting a plug connector. The plug connector here can have at least one contact element which is configured so as to correspond with the second contact element for connecting to the terminal which is described at the outset and provided by means of the second contact element and able to be contacted from outside the housing.

A second contact element which is suitable for the above-described second interface and which in particular also interacts according to the intended use with the above-described first contact element having a socket, can suitably be provided by means of a rotary contact which at least on one side is configured as a pin contact.

As described above, a first interface can have a predetermined multiplicity of first contact elements, wherein a suitable second interface which is configured so as to correspond with the first interface can have a corresponding number of second contact elements.

An interface which has been described at the outset and is configured so as to be double-sided and/or in two parts can in particular have a first interface having a multiplicity of first contact elements and/or a second interface having a multiplicity of second contact elements, wherein the first contact elements and/or the second contact elements can in each case be disposed at a predetermined mutual spacing, and wherein the first and/or second contact elements can in each case be disposed so as to be mutually parallel. In this way, an interface which is configured so as to be double-sided and/or in two parts can be conceived in a simple manner so as to be optimized for many applications.

An interface which is configured so as to be double-sided and/or in two parts can in particular be configured so as to be suitable for connecting a power terminal connector, wherein the interface can have three mutually corresponding first and second contact elements for connecting one phase, one N-conductor and one PE-conductor, and/or the interface can have five mutually corresponding first and second contact elements for connecting three phases, one N-conductor and one PE-conductor.

A first contact element which is particularly suitable for the first interface has been described in detail above, by means of which first contact elements a printed circuit board contact having a multiplicity of advantages can be provided, as has likewise been described above; the invention accordingly moreover relating to a printed circuit board contact for electrically contacting a printed circuit board which is accommodated in a housing.

The printed circuit board contact here is suitably configured as a stamped-bent contact having a flat central portion. At least one foot on a first side of the central portion extends in a first direction, wherein the foot is provided for connecting to a terminal of the printed circuit board.

A socket having an axis on a second side of the central portion is configured by means of a bend in the stamped-bent contact, said socket being provided for connecting to a pin contact.

The stamped-bent contact here is suitably configured in such a manner that by means of the stamped-bent contact an above-described contact element of the first interface of a double-sided and/or two-part interface according to the invention is provided.

Further details of the particularly simple mounting of an interface according to the invention which is configured so as to be double-sided and/or in two parts can be derived from the description of the exemplary embodiment hereunder.

EXEMPLARY EMBODIMENT

An exemplary embodiment of the invention is illustrated in the drawings and will be explained in more detail hereunder. In the drawing.

The figures contain schematic illustrations which in some instances are simplified. In some instances, identical reference signs are used for similar elements which however may not be identical. Different views of identical elements may be to different scales.

Figure 1A:
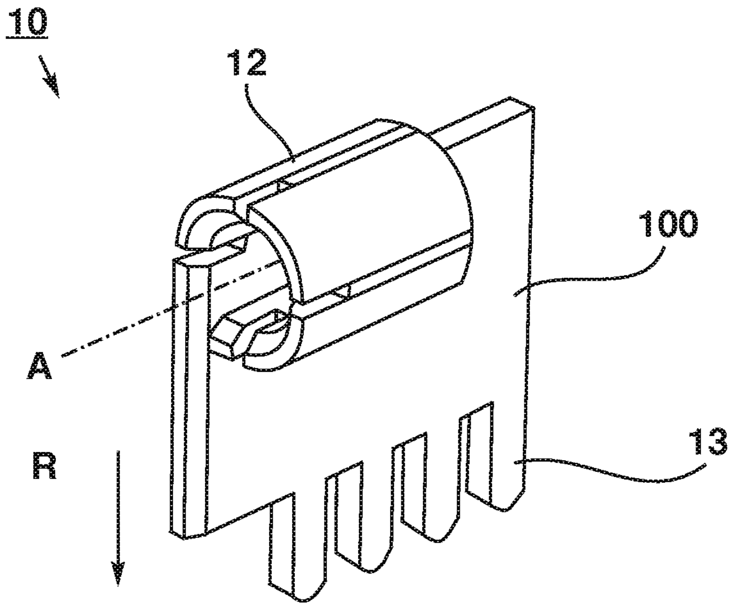
FIG. 1A shows a perspective illustration of a printed circuit board contact according to one embodiment of the invention.
Figure 1B:
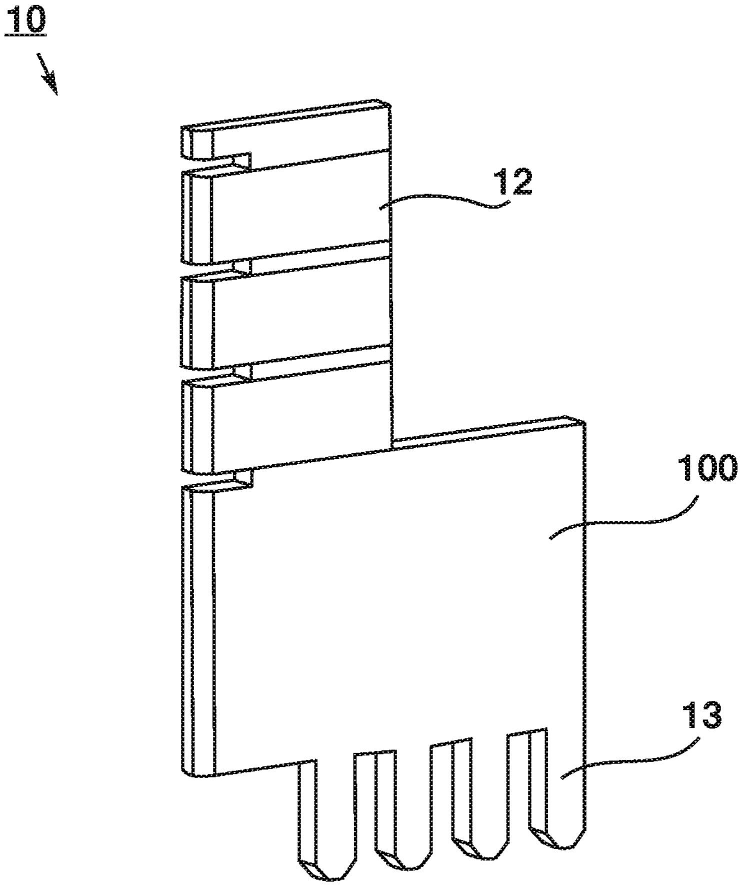
FIG. 1B shows a stamped blank of the printed circuit board contact of FIG. 1A.

FIG. 1A shows a perspective illustration of a printed circuit board contact 10 according to one embodiment of the invention, and FIG. 1B shows a stamped metal blank of the printed circuit board contact 10 of FIG. 1A. Provided by means of the printed circuit board contact 10 is a first contact element 10, described at the outset, of a first interface 1 according to one embodiment of the invention. The blank of the printed circuit board contact 10 has a predetermined thickness and a central portion 100.

Mutually spaced apart feet 13 on a first side of the central portion 100 extend in a first direction R, and a portion of the printed circuit board contact 10 that is bent so as to form a socket 12 extends on a second side of the central portion 100 that is opposite the first side. The axis A of the socket 12 here is disposed so as to be perpendicular to the first direction R. The central portion 100 suitably has a height which corresponds with an opening 40 which is configured on a wall of a housing 4.

The feet 13 are provided for contacting terminals 30 of a printed circuit board 3 that correspond with the feet 13, and are configured and disposed in a correspondingly suitable manner. The socket 12 is provided for contacting a second contact element 20, described at the outset, of a second interface 2, and is configured and disposed in a correspondingly suitable manner.

The periphery of the opening of the socket 12 that is provided for inserting a contact pin 22 of a second contact element 20 suitably has a taper such that an insertion funnel is provided for the contact pin 22 to be easily inserted. Moreover, the periphery of the opening of the socket 12 that is provided for inserting a contact pin 22 for the same purpose has slotted recesses, the periphery accordingly having a ductility which is increased in comparison to the further profile of the socket 12.

Figure 2A:
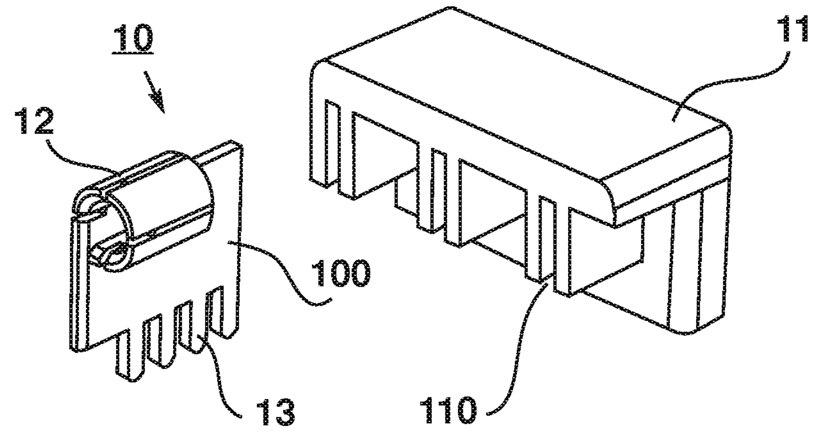
FIG. 2A shows the printed circuit board contact of FIG. 1A together with an insulating member which according to one embodiment of the invention is suitable for the printed circuit board contact.
Figure 2B:
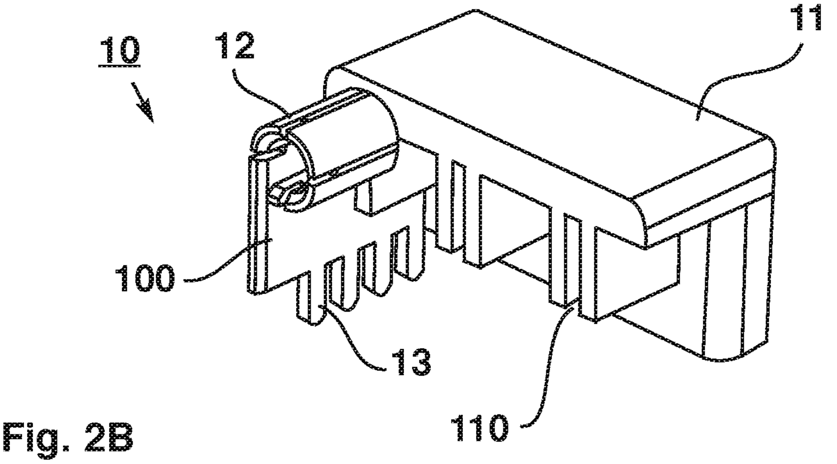
FIG. 2B shows the printed circuit board contact accommodated in the insulating member.
Figure 2C:
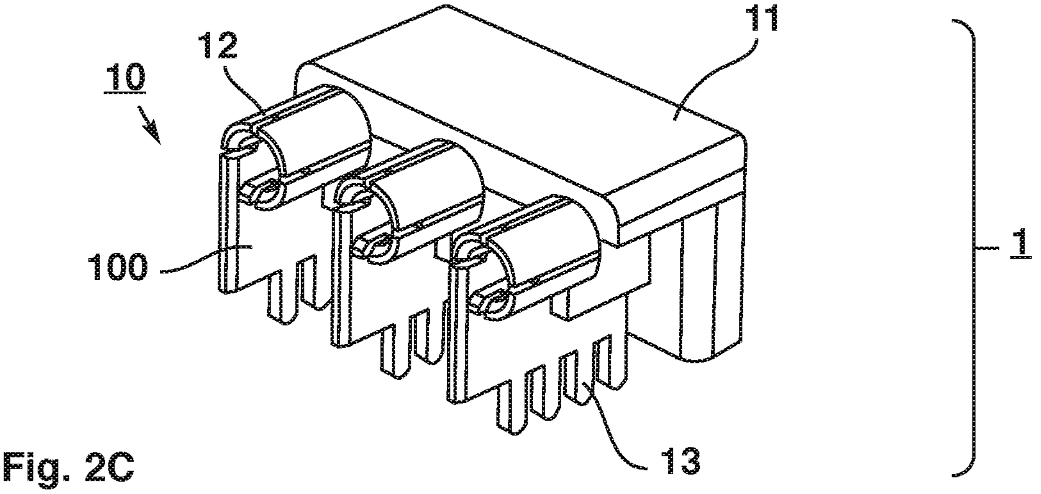
FIG. 2C shows the insulating member having three printed circuit board contacts accommodating the former, such that a first interface according to one embodiment of the invention is provided.

FIG. 2A shows the printed circuit board contact 10 of FIG. 1A together with an insulating member 11 according to one embodiment of the invention that is suitable for the printed circuit board contact 10; FIG. 2B shows the printed circuit board contact 10 accommodated in the insulating member 11; and FIG. 2C shows the insulating member 11 having three printed circuit board contacts 10 accommodated therein such that a first interface 1 according to one embodiment of the invention is provided. The insulating member 11 of FIG. 10, conceived for three printed circuit board contacts 10, is specifically completely equipped with three printed circuit board contacts 10. The printed circuit board contacts 10, in particular also by way of the axes A of the sockets 12 thereof, here are suitably disposed so as to be mutually parallel, wherein the sockets 12 are aligned in one direction.

The insulating member 11 imparts the first interface 1 a desirable stability, and clearances and creepage distances in the first interface 1 can be advantageously extended as a result of the insulating member 11. Moreover, the insulating member 11 simplifies the mounting of the first interface 1 on a printed circuit board 3. In order for the printed circuit board contacts 10 to be accommodated, the insulating member 11 has three rail-type fixing contours 110 which interact in each case in a form-fitting manner with a shoulder of the printed circuit board contact 10 that is configured so as to be adjacent to the socket 12.

Provided by means of the insulating member 11 which is completely equipped with three printed circuit board contacts 10 is a first interface 1 according to one embodiment of the invention, said first interface 1 being ready for mounting at the position according to the intended use on the periphery of a printed circuit board 3.

Figure 3A:
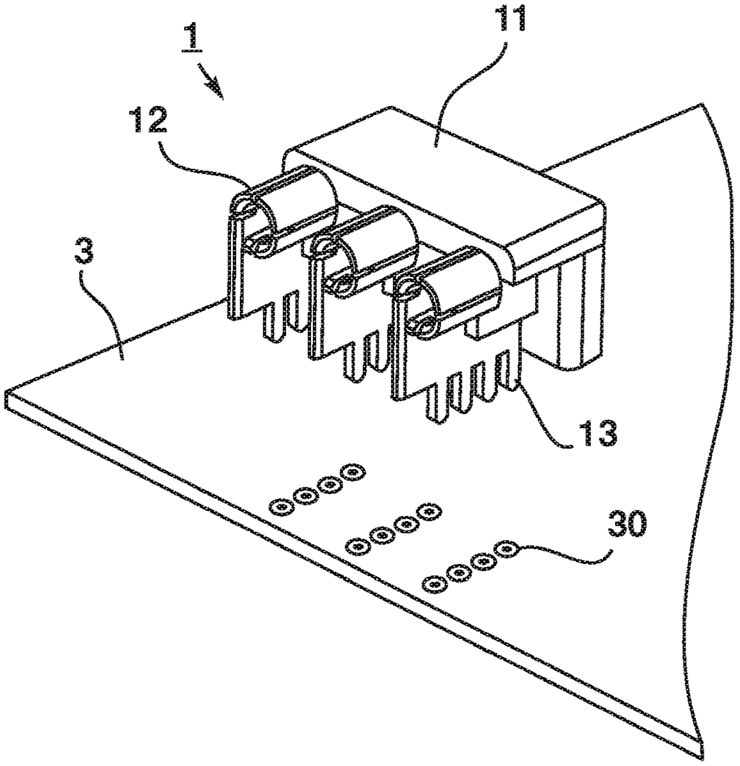
FIG. 3A shows the first interface of FIG. 2C together with a printed circuit board.
Figure 3B:
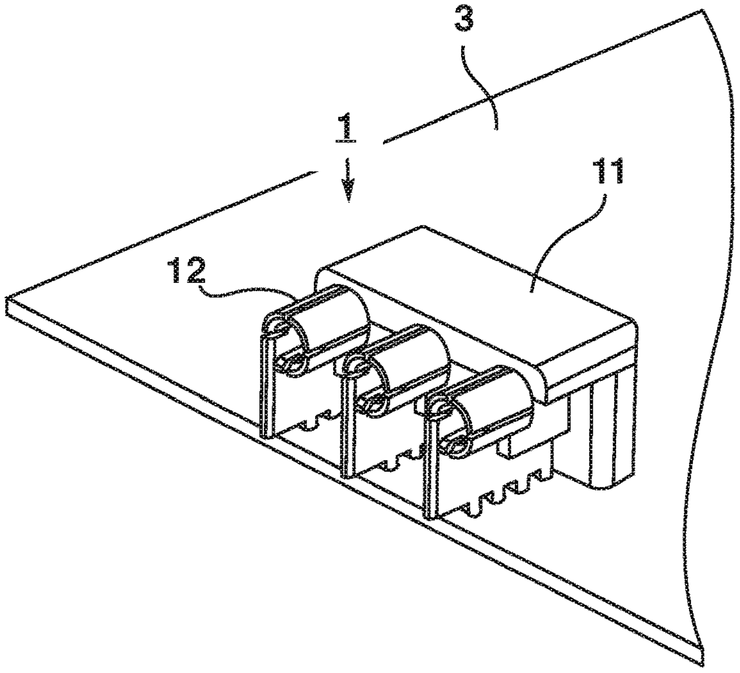
FIG. 3B shows the first interface mounted on the printed circuit board.

To this end, FIG. 3A shows the first interface 1 of FIG. 2C together with a printed circuit board 3, and FIG. 3B shows the first interface 1 mounted on the printed circuit board 3, wherein the feet 13 of the first interface 1 are press-fitted and/or soldered to terminals 30 which on the printed circuit board 3 are provided for the feet 13. The terminals 30 here are configured as recesses in the printed circuit board 3 into which the feet 13 engage. The feet 13 and the recesses 30 here have dimensions and are disposed at a predetermined spacing such that only small solder joints are required for soldering the feet 13 to the terminals 30 and that generation of heat at the contact point between the terminals 30 of the printed circuit board 3 and the feet 13 on the printed circuit board 3 at a high current flow into the printed circuit board 3 through a first contact element 10 is kept ideally low.

The insulating member 11 by way of the bottom side thereof here is disposed so as to be adjacent to the printed circuit board 3 in such a manner that the insulating member 11 sits on the printed circuit board 3. The printed circuit board contacts 10 here are disposed on the periphery of the printed circuit board 3 in such a manner that said printed circuit board contacts 10 protrude beyond the periphery of the printed circuit board 30 by a predetermined minor amount. The predetermined minor amount here is conceived in such a manner that the printed circuit board 3, having the first interface 1 mounted thereon, can be inserted from above into a housing 4 which is open at the top and mounted at the position according to the intended use of said printed circuit board 3 on the base of the housing 4 without the printed circuit board 3 being slanted or tilted.

Figure 4A:
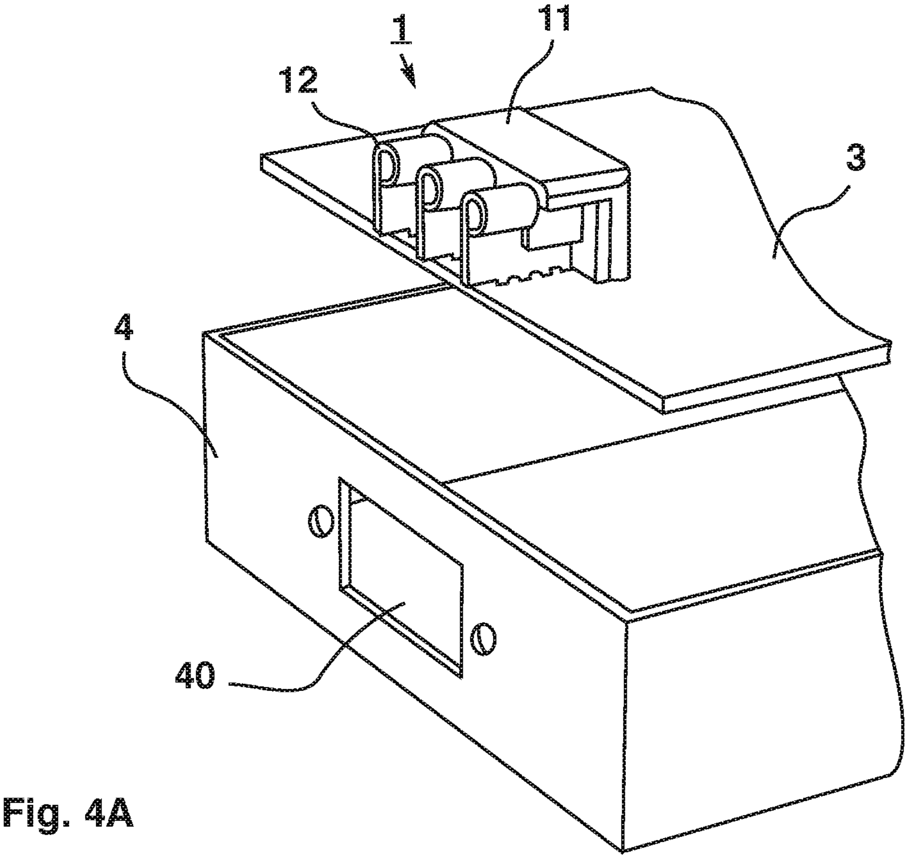
FIG. 4A shows the printed circuit board of FIG. 3B equipped with the first interface, together with a housing.
Figure 4B:
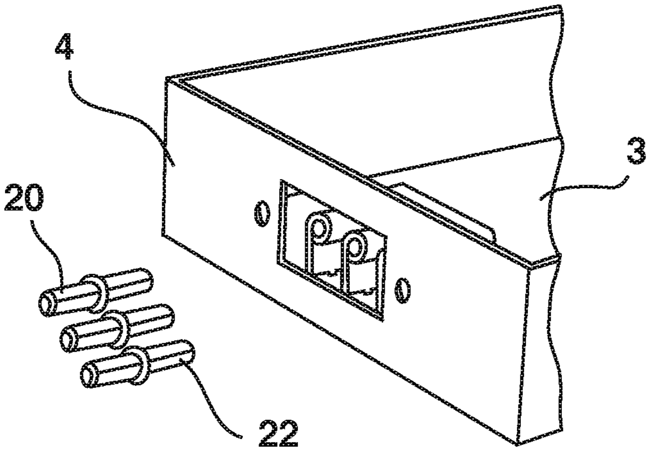
FIG. 4B shows the housing with the printed circuit board accommodating the former and provided with the first interface, together with three contact elements of a second interface according to one embodiment of the invention.

To this end, FIG. 4A shows the printed circuit board 3 of FIG. 3B equipped with the first interface 1, disposed together with a housing 4 above an upper opening of the housing 4, and FIG. 4B shows the housing 4, having the printed circuit board 3 accommodated therein at the position according to the intended use of said printed circuit board 3 on the base of the housing 4 and provided with the first interface 1, together with three second contact elements 20 of a second interface 2, described at the outset, according to one embodiment of the invention.

The sockets 12 of the printed circuit board contacts 10, or of the first contact elements 10 of the first interface 1, respectively, here are disposed so as to be adjacent to an opening 40 configured on a wall of the housing 4, wherein the sockets 12 by way of the openings provided for inserting contact pins 22 are accessible from the outside by way of the opening 40 of the housing 4. The sockets 12 by way of the axis A thereof here are disposed so as to be parallel to the printed circuit board which is accommodated in the housing 4. The contact elements 20 are configured as double-sided pin contacts 22 and can be suitably provided by means of rotary contacts.

Figure 5A:
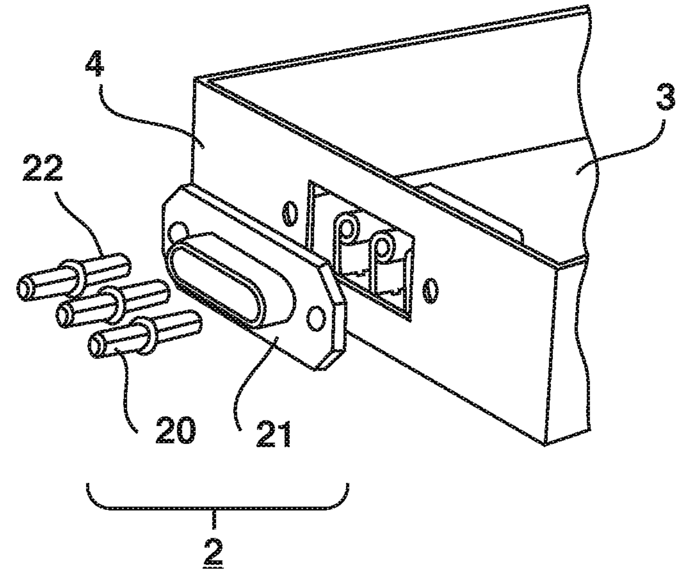
FIG. 5A shows the housing and the contact elements of FIG. 4B together with an insulating member for accommodating the contact elements of the second interface.
Figure 5B:
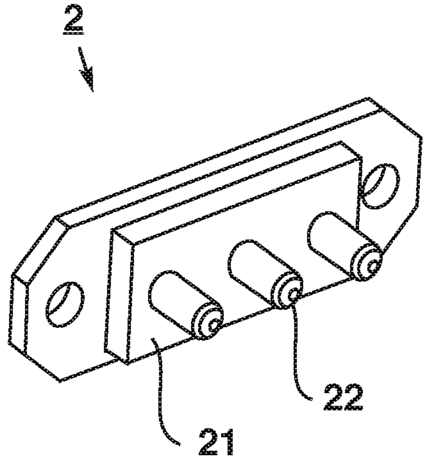
FIG. 5B shows the contact elements of the second interface accommodated in the insulating member such that the second interface is provided.

FIG. 5A shows the housing 4 and the second contact elements 20 of FIG. 4B together with an insulating member 21 for accommodating the second contact elements 20 of the second interface 2, and FIG. 5B shows the second contact elements 20 accommodated in the insulating member 21 such that the second interface 2 is provided by the insulating member 21 which is completely equipped with the second contact elements 20. FIG. 5B here shows the second interface 2 from that side thereof that faces the interior of the housing 4 and the wall of the housing 4.

The insulating member 21 is configured in a form-fitting manner with the opening 40 of the housing 4 in such a manner that, when disposing the equipped insulating member 21 at the position according to the intended use at the opening 40 of the housing 4, the contact elements 20 which are configured as contact pins 22 and protrude from the insulating member 21 extend into the interior of the housing 4 and are inserted according to the intended use into the sockets 12 of the first contact elements 10 such that contact between the first contact elements 10 and the second contact elements 20 is provided.

In order for the second contact elements 20 to be accommodated in the second insulating member 21, the insulating member 21 is configured from a suitable plastics material and has a predetermined thickness and/or a predetermined internal contour which corresponds with the contour of the second contact elements 20 in such a manner that the second contact elements 20 can be inserted into the insulating member 21 in such a manner that said contact elements 20 are accommodated and fixed in a locationally fixed manner in the insulating member 21.

Figure 6A:
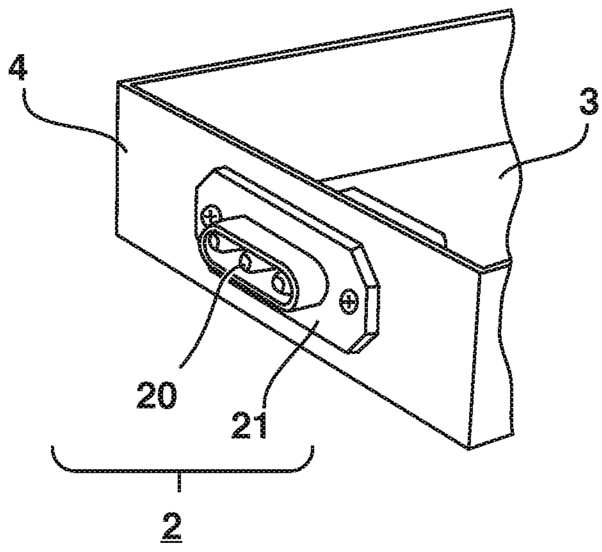
FIG. 6A shows the housing of FIG. 5A having the second interface mounted on the housing and the first interface, wherein a double-sided and/or two-part interface according to one embodiment of the invention is provided.
Figure 6B:
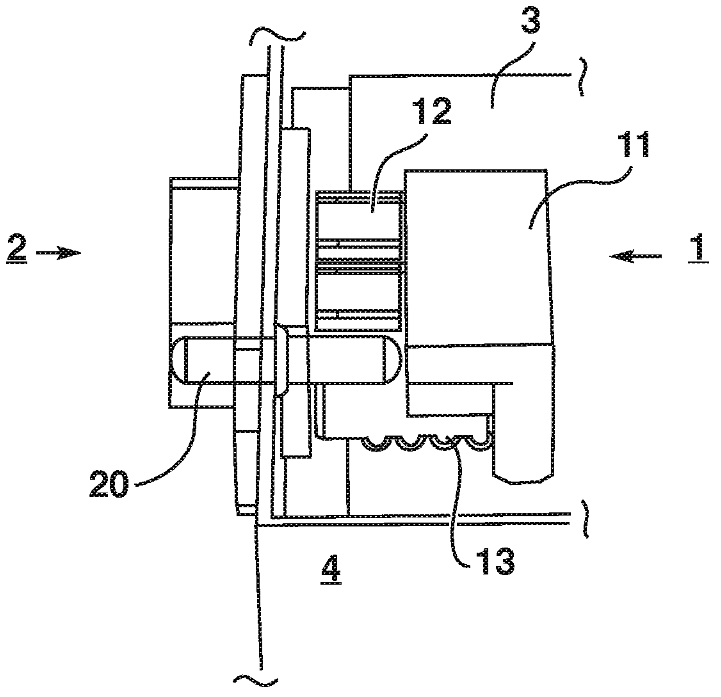
FIG. 6B shows the double-sided interface of FIG. 6A in a partially transparent illustration.

To this end, FIG. 6A shows the housing 4 of FIG. 5A having the second interface 2 mounted on the housing 4 and the first interface 1 such that a double-sided and/or two-part interface, described at the outset, according to one embodiment of the invention is provided, and FIG. 6B shows the double-sided and/or two-part interface of FIG. 6A that is disposed according to the intended use on the housing 4 and the printed circuit board 3 in a partially transparent illustration, wherein for the sake of clarity only one second contact element 20 and two first contact elements 10 are illustrated in FIG. 6B.

The second interface 2 by way of the insulating member 21 thereof at the position according to the intended use of said second interface 2 at the opening 40 of the housing 4 is screwed to a wall of the housing 4, wherein the contact pins 22 of the second contact elements 20 of the second interface 2 that extend into the interior of the housing 4 are inserted according to the intended use into the sockets 12 of the first contact elements 10, contact between the first contact elements 10 of the first interface 1 and the second contact elements 20 of the second interface 2 being accordingly provided. In order for a tolerance in terms of the position of the first interface 2 which is situated in the interior of the housing 4 to be compensated for, the opening 40 of the housing 4 and/or the insulating member 21 and/or in particular the bores of the latter for fastening screws can be oversized to a predetermined extent.

The ends of the second contact elements 20 that are accessible on the external side of the housing 4 in this embodiment of the invention are likewise configured as pin contacts and provide in each case a terminal which is accessible from outside the housing 4, wherein the second interface 2 is in particular suitably configured for connecting a plug connector 5.

Figure 7A:
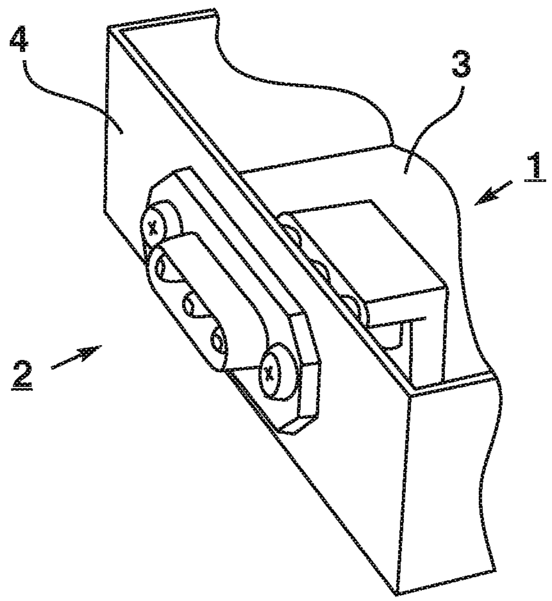
FIG. 7A shows the double-sided interface of FIG. 6A in an enlarged illustration from another perspective.
Figure 7B:
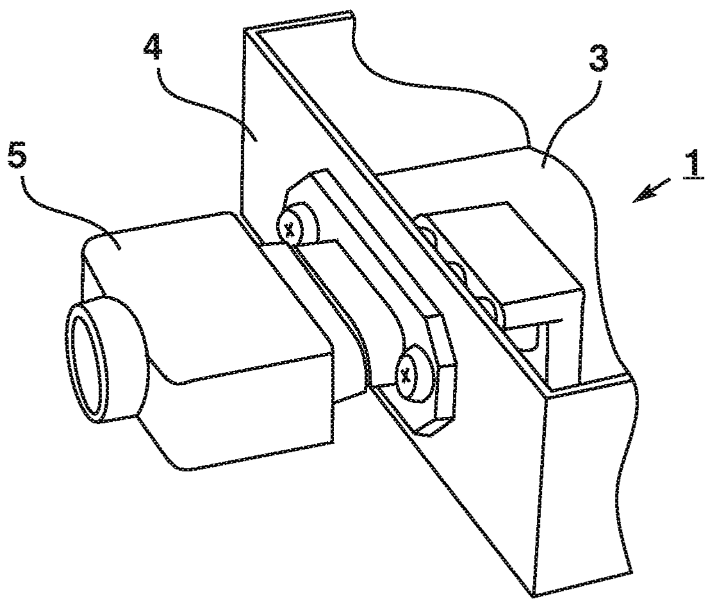
FIG. 7B shows a plug connector which is provided with three contact elements and connected to the double-sided interface.

To this end, FIG. 7A shows the double-sided and/or two-part interface of FIG. 6A in an enlarged illustration from another perspective, and FIG. 7B shows a plug connector which has three contact elements, not shown in the drawing, and which is plugged onto the second interface 2 and in this way is connected to the double-sided and/or two-part interface. The contact elements of the plug connector 5 that are not illustrated can be suitable socket contact elements which correspond with the second contact elements 20 that are configured as a double-sided pin contact 22.

By means of a described double-sided and/or two-part interface of one embodiment of the invention, plug-in and/or extraction forces which arise when plugging-in and/or releasing the plug connector 5 are advantageously absorbed by the housing 4 and/or the second interface 2, the printed circuit board 3 accordingly being protected against undesirable stresses and a particularly reliable double-sided and/or two-part interface being in particular provided for connecting a plug connector 5, said interface here being suitably conceived for a desirable multiplicity of plug-in cycles.

The double-sided and/or two-part interface is in particular configured so as to be suitable for connecting a power terminal connector, wherein the interface has three first 10 and second 20 contact elements for connecting one phase, one N-conductor and one PE-conductor. For example, the printed circuit board 3 can be a printed circuit board 3 of a power supply unit, in particular of a computer server.

While different aspects or features of the invention are in each case shown in combination in the figures, it is obvious to the person skilled in the art that the combinations illustrated and discussed are not the only combinations possible, unless otherwise stated. In particular, mutually corresponding units or sets of features from different exemplary embodiments can be interchanged with one another.

Interface for a Printed Circuit Board

LIST OF REFERENCE SIGNS

1 Interface
10 Contact element, stamped-bent contact, printed circuit board contact
100 Central portion
11 Insulating member
110 Fixing contour
12 Socket
13 Foot
2 Interface
20 Contact element, rotary contact
21 Insulating member
22 Pin, pin contact
3 Printed circuit board
30 Terminal
4 Housing
40 Opening
5 Plug connector
A Axis
R Direction

The invention claimed is:

1. An interface for electrically contacting a printed circuit board which is accommodated in a housing, wherein the interface by a first and a second interface is configured as a double-sided interface, having the following features:

the first interface has at least one first contact element configured to be brought to electrically contact at least one first terminal of the printed circuit board;

the second interface has at least one second contact element;

the second interface is configured so as to correspond with the first interface and disposed in a locationally fixed manner on an opening of the housing in such a manner that the first and the second contact element are brought into contact with one another, and the second contact element provides a second terminal which is configured to be contacted from outside the housing, wherein plug-in and/or extraction forces acting on the terminal are absorbed by the second interface and/or the housing, wherein the second interface is provided by a second insulating member which is configured in a form-fitting manner with the opening of the housing, and in which the second contact element is configured so as to be locationally fixed in such a manner that one end of the second contact element extends into the interior of the housing, and one end of the second contact element is configured to provide the terminal which is accessible from outside the housing; and wherein the second insulating member is configured in such a manner and/or is configured to be disposed on the housing in such a manner and/or configured to have an internal contour which in a form-fitting manner can interact with a contour of the second contact element in such a manner that plug-in and/or extraction forces acting on the accessible terminal are absorbed by the second insulating member and/or the housing.

2. The interface as claimed in claim 1, wherein the first contact element is disposed and configured so as to correspond with the second contact element, wherein the first contact element is configured as a socket and the second contact element at least inside the housing is configured as a pin contact; and wherein the pin contact s configured to be inserted into the socket.

3. The interface as claimed in claim 2, wherein the first contact element is a stamped-bent contact having a flat central portion and having a curved portion which adjoins the central portion whereby to form the socket, wherein the socket by way of the axis thereof is configured to be disposed so as to be parallel to the printed circuit board.

4. The interface as claimed in claim 1, wherein the first contact element has at least one foot which is configured to be brought to contact at least one terminal of the printed circuit board.

5. The interface as claimed in claim 1, wherein the first contact element is at least partially accommodated in a first insulating member.

6. The interface as claimed in claim 1, comprising a multiplicity of first contact elements and/or feet and/or second contact elements, wherein the first contact elements and/or the second contact elements and/or the feet in each case are configured to be disposed at a predetermined mutual spacing, and wherein the first and/or second contact elements are in each case configured to be disposed so as to be mutually parallel.

7. The interface as claimed in claim 1, wherein the interface is configured for connecting a power terminal connector, wherein the interface has three first and second contact elements for connecting one phase, one N-conductor and one PE-conductor, and/or the interface has five first and second contact elements for connecting three phases, one N-conductor and one PE-conductor.

8. The interface as claimed in claim 1, wherein the second interface on the external side of the housing is configured for connecting a plug connector, wherein the plug connector has at least one contact element which is configured so as to correspond with the second contact element for connecting to the terminal, said second contact element being provided by the second contact element and is configured to be contacted from outside the housing.

9. A printed circuit board contact for electrically contacting a printed circuit board which is accommodated in a housing, having the following features:

the printed circuit board contact is a stamped-bent contact having a flat central portion;

at least one foot on a first side of the central portion extends in a first direction, wherein the foot is configured for connecting to a terminal of the printed circuit board;

a socket having an axis on a second side of the central portion is configured by a bend in the stamped-bent contact, said socket being provided for connecting to a pin contact;

wherein the stamped-bent contact is configured to form the first contact element of the interface as claimed in one of the preceding claims, wherein the second interface is provided by a second insulating member which is configured in a form-fitting manner with the opening of the housing, and in which the second contact element is configured so as to be locationally fixed in such a manner that one end of the second contact element extends into the interior of the housing, and one end of the second contact element is configured to provide the terminal which is accessible from outside the housing; and wherein the second insulating member is configured in such a manner and/or is configured to be disposed on the housing in such a manner and/or configured to have an internal contour which in a form fitting manner can interact with a contour of the second contact element in such a manner that and/or extraction forces acting on the accessible terminal are absorbed b the second insulating member and/or the housing.

10. A stamped-bent contact as claimed in claim 9, wherein the first direction and the axis are disposed so as to be mutually perpendicular.

11. The stamped-bent contact as claimed in claim 9, having a multiplicity of feet which on the first side of the central portion extend in the first direction, wherein the feet are provided for a corresponding multiplicity of terminals of the printed circuit board, and wherein the feet are disposed at a predetermined mutual spacing.

12. The stamped-bent contact as claimed in claim 10, having a multiplicity of feet which on the first side of the central portion extend in the first direction, wherein the feet are provided for a corresponding multiplicity of terminals of the printed circuit board, and wherein the feet are disposed at a predetermined mutual spacing.

13. The interface as claimed in claim 2, wherein the first contact element has at least one foot which is configured to be brought to contact at least one terminal of the printed circuit board.

14. The interface as claimed in claim 2, wherein the first contact element is at least partially accommodated in a first insulating member.

15. The interface as claimed in claim 2, comprising a multiplicity of first contact elements and/or feet and/or second contact elements, wherein the first contact elements and/or the second contact elements and/or the feet in each case are configured to be disposed at a predetermined mutual spacing, and wherein the first and/or second contact elements are in each case configured to be disposed so as to be mutually parallel.

16. The interface as claimed in claim 2, wherein the interface is configured for connecting a power terminal connector, wherein the interface has three first and second contact elements for connecting one phase, one N-conductor and one PE-conductor, and/or the interface has five first and second contact elements for connecting three phases, one N-conductor and one PE-conductor.

17. The interface as claimed in claim 2, wherein the second interface on the external side of the housing is configured for connecting a plug connector, wherein the plug connector has at least one contact element which is configured so as to correspond with the second contact element for connecting to the terminal, said second contact element being provided by the second contact element and is configured to be contacted from outside the housing.

18. The interface as claimed in claim 3, wherein the first contact element has at least one foot which is configured to be brought to contact at least one terminal of the printed circuit board.

* * * * *